Patented Nov. 2, 1937

2,098,089

UNITED STATES PATENT OFFICE 2,098,089

PRODUCTION OF CHLORBUTADIENE

Ernst Eberhardt, Ludwigshafen-on-the-Rhine, and Robert Stadler, Heidelberg, Germany, assignors to I. G. Farbenindustrie Aktiengesellschaft, Frankfort-on-the-Main, Germany No Drawing. Application April 18, 1936, Serial No. 75,236. In Germany April 27, 1935

5 Claims. (Cl. 260—166)

The present invention relates to the production of $\beta$-chlorbutadiene from gases containing vinyl acetylene.

It has already been proposed to prepare halogen butadienes by the treatment of vinyl acetylene with halogen hydracids in the liquid phase.

We have now found that chlorbutadiene can be prepared in a simple manner from gases containing vinyl acetylene (which are obtainable for example by leading electric-arc-acetylene over a solid catalyst containing a compound of monovalent copper) by leading the said gases together with the appropriate amount of hydrogen chloride at elevated temperature over active carbon in the presence of halogen compounds of base metals of the 2nd or 4th group of the periodic system of the elements. Suitable halogen compounds of the said kind are in particular halogen mercury compounds, such as mercury or mercurous chloride, bromide or iodide, and also for example lead chloride or cadmium chloride, zinc chloride and stannous chloride. These metal halides may also be advantageously employed in admixture with each other or with metallic mercury. The active carbon may also be charged with the said metals themselves, the chlorides of the metals then being formed during the reaction.

The reaction may be carried out at temperatures of between 50° and 200° C., preferably at between 100° and 150° C. The gases may be brought into reaction in the dry state or in admixture with steam.

The formation of dichlorbutene may be suppressed to a great extent during the process because the addition of hydrogen chloride may be accurately regulated. Instead of gaseous hydrogen chloride, substances which split off hydrogen chloride, as for example phosgene together with steam, may be employed.

Having regard to the known property of active carbon of exerting a polymerizing action on higher acetylenes, it is contrary to expectation that the addition of hydrogen chloride should proceed smoothly without any polymerization.

The following examples will further illustrate how the present invention may be carried out in practice, but the invention is not restricted to these examples.

Example 1

A gas consisting mainly of hydrogen and containing about 10 per cent of vinyl acetylene is led at a speed of 30 liters per hour together with 3 liters of hydrogen chloride gas over 600 cubic centimeters of active carbon which is laden with calomel, the temperature being 120° C. The gas mixture leaves the reaction chamber with a vinyl acetylene content of about 3 per cent. In the course of 24 hours, 190 grams of chlorbutadiene (boiling point 60° C., density 0.956) and about 5 grams of dichlorbutene are obtained. The unconverted vinyl acetylene is condensed with the chlorbutadiene in cooled receivers and is returned to the reaction chamber after distilling it off from the condensate.

Example 2

A gas mixture of the composition specified in Example 1 is led together with hydrogen chloride gas in the manner described in Example 1 over active carbon which has been laden with metallic mercury, the temperature being 130° C. The gas leaves the reaction chamber with a vinyl acetylene content of about 3 per cent. During the course of 24 hours, 152 grams of chlorbutadiene and about 4 grams of dichlorbutene are obtained.

Example 3

A gas mixture containing 10 per cent of vinyl acetylene the remainder being mainly nitrogen is led together with hydrogen chloride at a speed of 30 liters per hour at 100° C. over 600 cubic centimeters of active carbon which is laden with cadmium chloride. During the course of 24 hours, about 80 grams of liquid chlorbutadiene and from 2 to 3 grams of products of higher boiling point are obtained.

Example 4

A gas mixture containing 8 per cent of vinyl acetylene, the remainder being hydrogen and methane, is led together with hydrogen chloride in a moist state and with a speed of 60 liters per hour at 100° C. over 600 cubic centimeters of active carbon which is laden with lead chloride. During the course of 24 hours, 105 grams of chlorbutadiene and 5 grams of products of higher boiling point are obtained.

Example 5

A gas mixture of the composition specified in Example 1 is saturated with water vapour at 70° C. and led at a speed of 30 liters per hour at 120° C. over 600 cubic centimeters of active carbon which is laden with calomel. Shortly before entry into the reaction chamber, an amount of phosgene (1.5 liters per hour) corresponding to the vinyl acetylene content is mixed with the gas mixture. The gas mixture leaving the reaction chamber has a vinyl acetylene content of about 1 per cent. During the course of 24 hours, 150 grams of chlorbutadiene and about 2 grams of dichlorbutene are obtained.

What we claim is:—

1. A process of producing chlorbutadiene from gases containing vinyl acetylene which comprises leading the said gases together with the corresponding amount of hydrogen chloride at elevated temperature over active carbon in the presence of a halide of a metal selected from the group consisting of base metals of the second and fourth groups of the periodic system of the elements.

2. A process of producing chlorbutadiene from gases containing vinyl acetylene which comprises leading the said gases together with the corresponding amount of hydrogen chloride over active carbon in the presence of a halide of a metal selected from the group consisting of base metals of the second and fourth groups of the periodic system of the elements at temperatures of between 50° C. and 200° C.

3. A process of producing chlorbutadiene from gases containing vinyl acetylene which comprises leading the said gases together with the corresponding amount of hydrogen chloride over active carbon in the presence of a halide of a metal selected from the group consisting of base metals of the second and fourth groups of the periodic system of the elements at temperatures of between 100° C. and 150° C.

4. A process of producing chlorbutadiene from gases containing vinyl acetylene which comprises leading the said gases together with substances which yield hydrogen chloride under the reaction conditions at elevated temperature over active carbon in the presence of a halide of a metal selected from the group consisting of base metals of the second and fourth groups of the periodic system of the elements.

5. A process of producing chlorbutadiene from gases containing vinyl acetylene which comprises leading the said gases together with the corresponding amount of hydrogen chloride at elevated temperature over active carbon in the presence of mercurous chloride.

ERNST EBERHARDT.
ROBERT STADLER.